US010220873B2

(12) United States Patent
Radabaugh

(10) Patent No.: US 10,220,873 B2
(45) Date of Patent: Mar. 5, 2019

(54) SYSTEM AND METHOD FOR PROVIDING A VARIABLE LIMIT ON ACTIVE DRYER ASSISTANCE SYSTEM STEERING AUTHORITY

(71) Applicant: Scott L Radabaugh, Rochester Hills, MI (US)

(72) Inventor: Scott L Radabaugh, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/657,319

(22) Filed: Jul. 24, 2017

(65) Prior Publication Data

US 2019/0023304 A1  Jan. 24, 2019

(51) Int. Cl.
| | |
|---|---|
| *B62D 1/28* | (2006.01) |
| *B60W 30/12* | (2006.01) |
| *B60W 30/18* | (2012.01) |
| *B60W 10/20* | (2006.01) |
| *B60W 50/08* | (2012.01) |
| *G05D 1/00* | (2006.01) |

(52) U.S. Cl.
CPC .............. *B62D 1/286* (2013.01); *B60W 10/20* (2013.01); *B60W 30/12* (2013.01); *B60W 30/18163* (2013.01); *B60W 50/082* (2013.01); *G05D 1/0088* (2013.01)

(58) Field of Classification Search
CPC ...................................................... B62D 1/286
See application file for complete search history.

(56) References Cited

U.S. PATENT DOCUMENTS

| | | | |
|---|---|---|---|
| 5,765,116 | A | 6/1998 | Wilson-Jones et al. |
| 8,392,066 | B2 | 3/2013 | Ehara et al. |
| 8,825,302 | B2 | 9/2014 | Schmidt |
| 2009/0192710 | A1* | 7/2009 | Eidehall ............. B62D 15/0265 701/301 |
| 2009/0194350 | A1 | 8/2009 | Rattapon et al. |
| 2009/0216404 | A1 | 8/2009 | Maass |
| 2010/0152952 | A1 | 6/2010 | Lee et al. |
| 2011/0098890 | A1* | 4/2011 | Lee .......................... B62D 1/286 701/42 |
| 2013/0060413 | A1 | 3/2013 | Lee et al. |

FOREIGN PATENT DOCUMENTS

DE          10144797 A1     3/2003

* cited by examiner

*Primary Examiner* — Imran K Mustafa
(74) *Attorney, Agent, or Firm* — Ralph E Smith

(57) ABSTRACT

A control system and method of operating a vehicle having an active driver assistance system includes receiving, from a steering wheel torque sensor, a measured torque applied to a steering wheel of the vehicle by a driver of the vehicle, obtaining a steering torque request for an active steering feature of the active driver assistance system, determining a steering torque request limit for the active steering feature based on the measured steering wheel torque, wherein an increase in the steering wheel torque corresponds to a decrease in the steering torque request limit and vice-versa, limiting the steering torque request based on the steering torque request limit, wherein the limited steering torque request is greater than zero, and commanding a steering actuator as part of the active steering feature based on the limited steering torque request, the steering actuator being configured to control steering of the vehicle.

12 Claims, 3 Drawing Sheets

SYSTEM AND METHOD FOR PROVIDING A VARIABLE LIMIT ON ACTIVE DRYER ASSISTANCE SYSTEM STEERING AUTHORITY

FIELD

The present application generally relates to advanced driver-assistance systems (ADAS) and, more particularly, to a system and method to provide a variable limit on steering authority for an active driver assistance system.

BACKGROUND

Advanced driver-assistance systems (ADAS) are designed to assist a driver in the process of driving a vehicle. The primary goal of these systems is to improve vehicle driving and safety. One component of an ADAS system is active steering assistance wherein the ADAS system assists with or directly controls the steering of the vehicle to follow a predetermined path. This can be as simple as "lane keeping," which selectively controls vehicle steering to keep the vehicle between lane lines or as complex as steering the vehicle to a predetermined destination without driver input. Active steering assistance is typically disabled whenever the driver takes control of a steering wheel of the vehicle and is not re-enabled until the driver re-engages the system. The driver, however, may believe that the system is always enabled and/or there could be a delay in reactivating a previously deactivated active steering assistance. Accordingly, while such systems work well for their intended purpose, there remains a need for improvement in the relevant art.

SUMMARY

According to one example aspect of the invention, an active driver assistance system for a vehicle is presented. In one exemplary implementation, the system comprises a steering wheel torque sensor configured to measure a torque applied to a steering wheel of the vehicle by a driver of the vehicle, a steering actuator configured to control steering of the vehicle, and a control system configured to: receive the measured steering wheel torque; obtain a steering torque request for an automatic steering feature of the active driver assistance system; based on the measured steering wheel torque, determine a steering torque request limit for the automatic steering feature, wherein the steering torque request limit is inversely proportional to the measured steering wheel torque applied by the driver such that an increase in the measured steering wheel torque corresponds to a decrease in the steering torque request limit and vice-versa; limit the steering torque request based on the steering torque request limit, wherein the limited steering torque request is greater than zero; and command the steering actuator as part of the automatic steering feature based on the limited steering torque request such that the automatic steering feature is suppressed but remains enabled and active while steering wheel torque is being applied by the driver, thereby enabling both the automatic steering feature and the driver to steer the vehicle with the measured steering wheel torque applied by the driver controlling over the automatic steering feature.

In some implementations, the control system is further configured to command the steering actuator by ramping up or down from a previous or current steering torque request to the limited steering torque request. In some implementations, the control system is configured to ramp up to the limited steering torque request at a different rate than it is configured to ramp down to the limited steering torque request.

In some implementations, the system further comprises a steering wheel contact sensor configured to detect hand contact by the driver on the steering wheel, wherein the control system is configured to determine the steering torque request limit based on whether or not driver hand contact is detected by the steering wheel contact sensor. In some implementations, no driver hand contact detected by the steering wheel contact sensor corresponds to an increase in the steering torque request limit and vice-versa.

In some implementations, the system further comprises a vehicle speed sensor configured to measure a speed of the vehicle, wherein the control system is configured to determine the steering torque request limit based on the measured vehicle speed. In some implementations, the control system is configured to determine the steering torque request based on captured information relating to keeping the vehicle on its desired path. In some implementations, the automatic steering feature is only disabled in response to an evasive or emergency maneuver by the driver where steering wheel power exceeds a threshold.

According to another example aspect of the invention, a method of operating a vehicle having an active driver assistance system is presented. In one exemplary implementation, the method comprises: receiving, by a control system of the vehicle and from a steering wheel torque sensor, a measured torque applied to a steering wheel of the vehicle by a driver of the vehicle; obtaining, by the control system, a steering torque request for an active steering feature of the active driver assistance system; determining, by the control system, a steering torque request limit for the active steering feature based on the measured steering wheel torque, the steering torque request limit being inversely proportional to the measured steering wheel torque applied by the driver such that an increase in the measured steering wheel torque corresponds to a decrease in the steering torque request limit for the automatic steering feature and vice-versa; and commanding, by the control system and based on the limited steering torque request, a steering actuator that is configured to control steering of the vehicle as part of the automatic steering feature, such that the automatic steering feature is suppressed but remains enabled and active while steering wheel torque is being applied by the driver, thereby enabling both the automatic steering feature and the driver to steer the vehicle with the measured steering wheel torque applied by the driver controlling over the enabled automatic steering feature.

In some implementations, commanding the steering actuator comprises ramping up or down, by the control system, from a previous or current steering torque to the limited steering torque request. In some implementations, the control system ramps up to the limited steering torque request at a different rate than it ramps down to the limited steering torque request.

In some implementations, the method further comprises receiving, by the control system and from a steering wheel contact sensor, a signal indicative of detected hand contact by the driver on the steering wheel, wherein the control system determines the steering torque request limit based on whether or not the driver hand contact is detected by the steering wheel contact sensor. In some implementations, no driver hand contact detected by the steering wheel contact sensor corresponds to an increase in the steering torque request limit and vice-versa.

In some implementations, the method further comprises receiving, by the control system and from a vehicle speed sensor, a measured speed of the vehicle, wherein the control system determines the steering torque request limit based on the measured vehicle speed. In some implementations, the method further comprises determining, by the control system, the steering torque request based on captured information relating to keeping the vehicle on its desired path. In some implementations, the active steering feature is only disabled in response to an evasive or emergency maneuver by the driver where steering wheel power exceeds a threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there remains a need for improvement in automatic driver-assistance systems (ADAS) and, more particularly, to active steering assistance systems. Conventional active steering assistance systems are either too weak or too strong. In weaker active steering assistance systems, only a small amount of steering torque is applied when the vehicle is drifting towards or out of a lane to notify the driver. These systems may be incapable of maintaining the vehicle in the lane during certain operating conditions. In stronger active steering assistance systems, a larger amount of steering torque is able to be applied, and thus the systems are able to keep the vehicle in the lane during a wider range of operating conditions (e.g., around a curve). These systems, however, require a large amount of driver steering torque to be overridden or disabled, which makes the drivers feel as if they are fighting against the systems.

Accordingly, a system and method are presented for providing a variable limit on the steering authority for an active steering assistance system. One potential benefit of this system and method is improved safety because the active steering assistance system is never disabled. Instead, its steering authority is merely limited depending on certain operating parameters. Another benefit is the ability for the driver to make small corrections during active steering assistance (e.g., a slight veer around a pothole or an oversized vehicle) without causing the system to be temporarily disabled. Example inputs include, but are not limited to, steering wheel torque, vehicle speed, and steering wheel hand contact. While the system/method are described herein as always being enabled, it will be appreciated that the system/method could be manually disabled (e.g., via a settings menu) and/or could be temporarily disabled in response to an evasive or emergency maneuver (e.g., steering wheel power exceeding a threshold, where steering wheel power represents steering wheel torque multiplied by steering wheel velocity).

Figure 1:
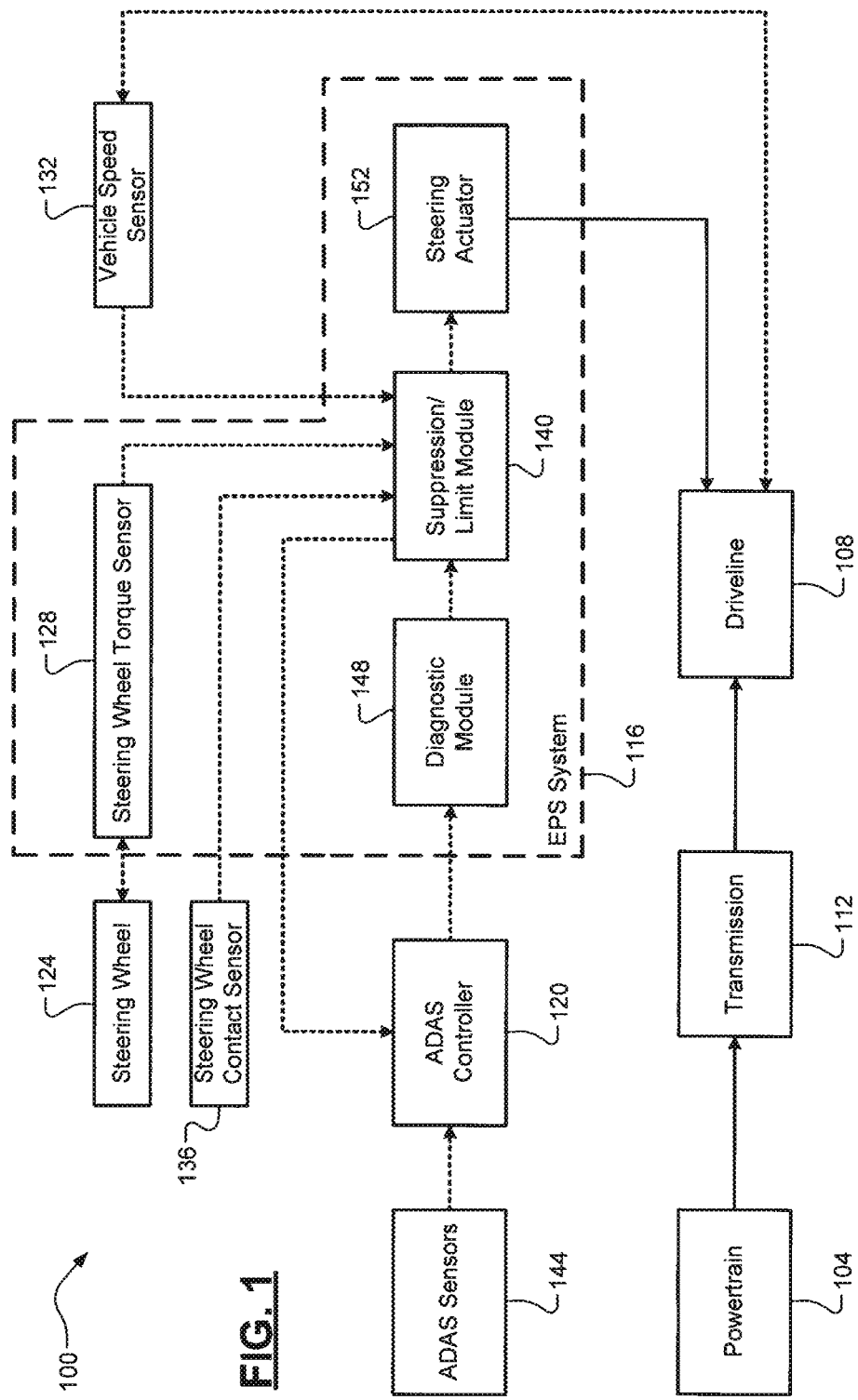
FIG. 1 is a diagram of an example vehicle according to some implementations of the present disclosure.

Referring now to FIG. 1, an example vehicle 100 is illustrated. The vehicle 100 includes a powertrain 104 that generates drive torque. Non-limiting examples of the powertrain 104 include an engine, an electric motor, and combinations thereof. The drive torque is transferred to a driveline 108 via a transmission 112. An electric power steering (EPS) system 116 is configured to control steering of the driveline 108. An ADAS controller 120 of the vehicle 100 provides input (e.g., a torque request) to the EPS 116. One example function of the ADAS controller 120 is to provide a steering assistance feature. The EPS system 116 and the ADAS controller 120 are collectively referred to herein as a "control system" for the vehicle 100. It will be appreciated, however, that portions of these systems 116, 120 could be separate controllers/modules or could be part of another controller, such as an engine control unit (ECU). For example only, a suppression or limit module 140 could be implemented in the ADAS controller 120 instead of in the EPS system 116 as illustrated and described herein.

The EPS system 116 receives a driver-applied torque to a steering wheel 124 from a steering wheel torque sensor 128. Greater steering wheel torque is indicative of more suppression or limiting of the active steering feature and vice-versa. In one exemplary implementation, the limit on the active steering feature is inversely proportional to the amount steering wheel torque. The EPS system 116 also receives a vehicle speed from a vehicle speed sensor 132 and a steering wheel hand contact indication (e.g., contact or no contact) from a steering wheel contact sensor 136. No hand contact is indicative of less suppression or limiting of the active steering feature and vice-versa. It will be appreciated that the EPS controller 116 could receive other inputs, such as other powertrain or chassis signals (speeds, temperatures, etc.) and/or vehicle environmental signals (traffic information, vehicle-to-vehicle communications, etc.). It will be appreciated that some of this functionality could be implemented in the ADAS controller 120 or another controller. The EPS system 116, however, is typically a higher-level system compared to the ADAS controller 120 and thus suppressing the ADAS torque request within the EPS system 116 provides for better safety integrity.

The suppression or limit module 140 of the EPS system 116 uses the received information from sensors 128, 132, and/or 136 to determine a steering torque request limit (e.g., a maximum steering torque). This steering torque request limit is also communicated back to the ADAS controller 120 to prevent winding up or oscillations in the control routines. The ADAS controller 120 receives input from a set of ADAS sensors 144, such as radar or lidar sensors, object proximity sensors, and/or cameras, to detect lane lines as part of the steering assistance or lane keeping feature. It will be appreciated that the ADAS sensors 144 and the other group of sensors 128-136 herein could at least partially overlap. When the vehicle 100 is deviating from its intended or desired path (e.g., towards or across a lane line), the ADAS controller 120 generates a steering torque request. An intermediate diagnostic of the magnitude and/or slew rate of the steering torque request could be performed by diagnostic module 148 to filter out of range steering torque requests.

Figure 2:
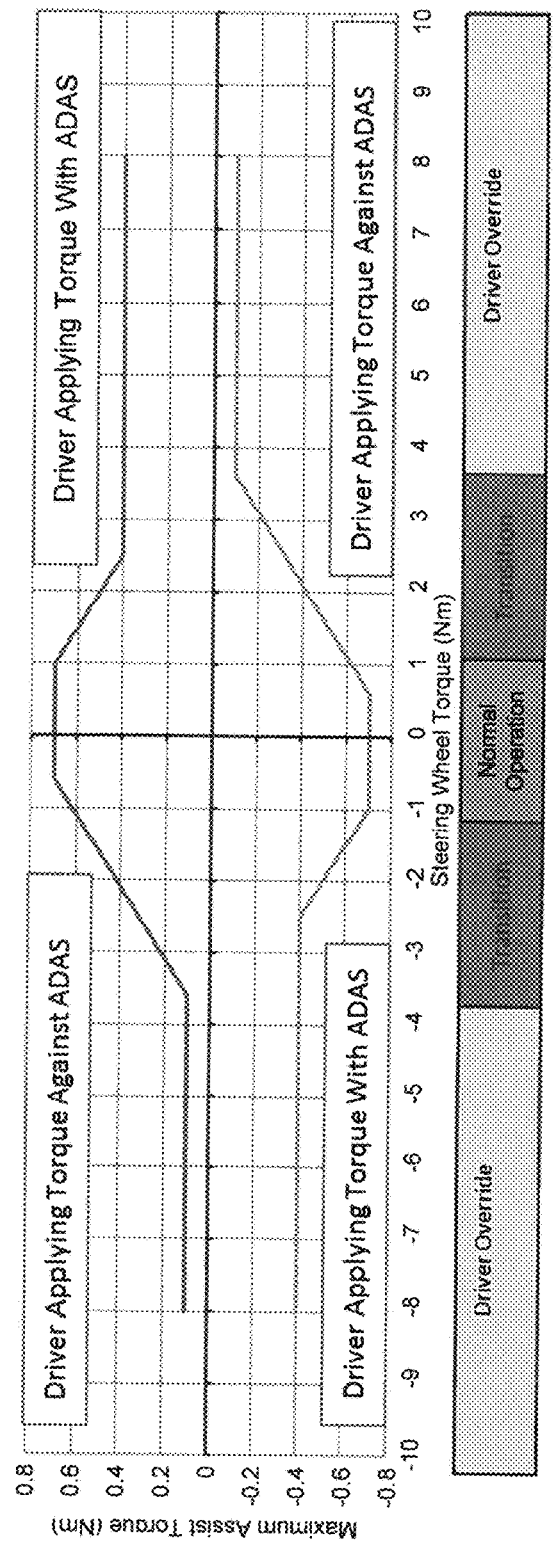
FIG. 2 is a plot illustrating driver-applied and automatic driver-assistance system (ADAS) torque according to some implementations of the present disclosure.

The suppression or limit module 140 of the EPS system 116 compares the steering torque request received from the ADAS controller 120 to the current steering request limit. If less than the current steering torque request limit, the EPS system 116 applies, via a steering actuator 152, the steering torque request. If greater than the current steering torque request limit, however, the EPS system 116 only applies, via the steering actuator 152, the steering torque request limit. In some implementations, the application of the steering wheel torque by the steering actuator 152 could be ramped in and ramped out by the suppression or limit module 140, e.g., from a previous or current steering torque request limit, as shown in FIG. 2. By gradually ramping the steering wheel torque in or out, the system and method of the present disclosure are able to achieve smooth suppression of the ADAS torque request such that it may not be noticed by the driver. For example, the driver may momentarily veer the vehicle 100 to an edge of a lane to avoid a pothole or an oversized vehicle after which the steering assistance feature would return the vehicle 100 to the center of the lane. Ramping down or out could be performed at a faster rate as illustrated such that the driver doesn't fight the ADAS system, whereas ramping up or in could be performed at a different rate (e.g., slower) such that the ADAS system doesn't startle the driver.

Figure 3:
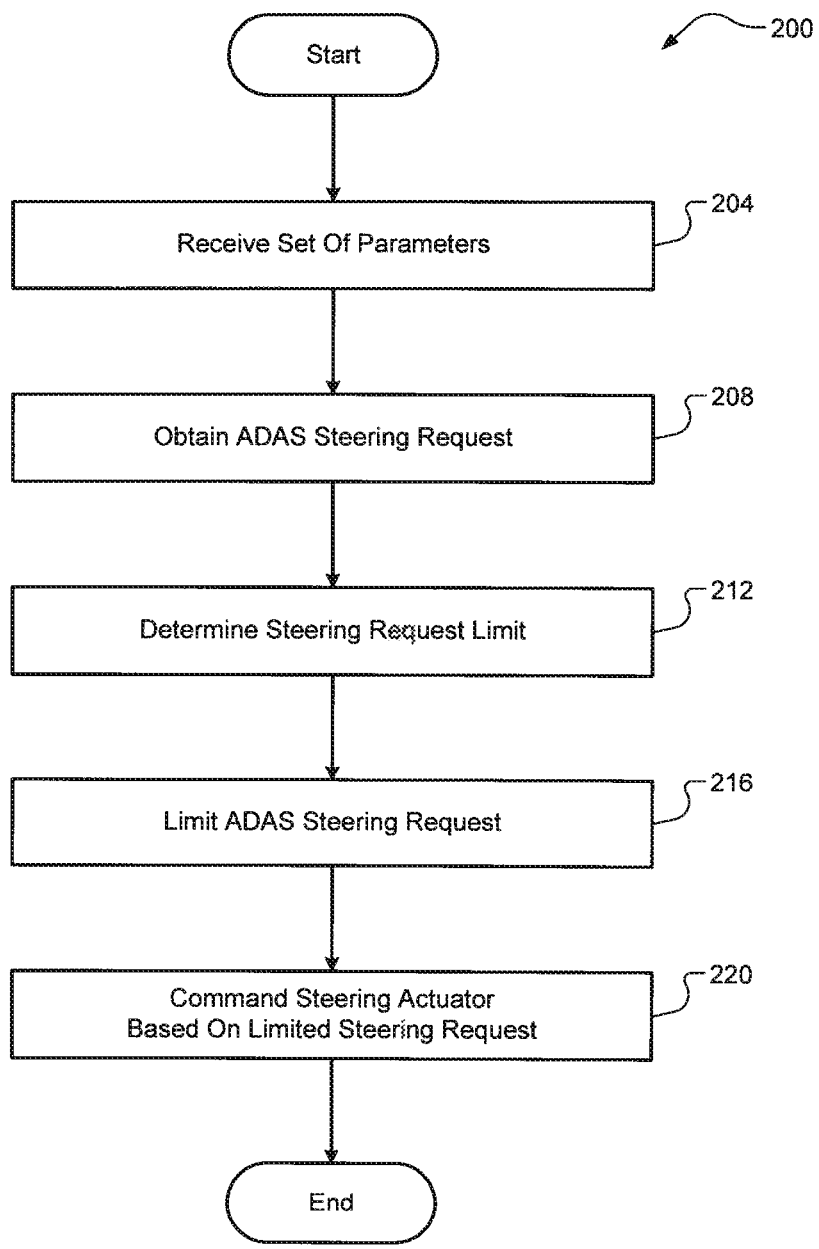
FIG. 3 is a flow diagram of a method of operating the vehicle according to some implementations of the present disclosure.

Referring now to FIG. 3, a flow diagram of a method 200 of operating the vehicle 100 is illustrated. At 204, the control system (e.g., the EPS system 116) receives, from at least the steering wheel torque sensor 128, a torque applied to the steering wheel 124 by the driver of the vehicle 100. The control system could also receive measured parameter(s) from the vehicle speed sensor 132 and/or the steering wheel contact sensor 136. At 208, the control system (e.g., the ADAS controller 120) obtains a steering torque request for an active steering feature, e.g., based on information captured by ADAS sensors 144. At 212, the control system (e.g., the EPS system 116) determines a steering torque request limit for the active steering feature based on the set of measured parameters, e.g., the measured steering wheel torque. For example, a greater measured steering wheel torque could further limit or suppress the steering torque request limit and vice-versa. At 216, the control system (e.g., the EPS system 116) limits the steering torque request based on the steering torque request limit, wherein the limited steering torque request is greater than zero. In other words, the active steering feature is not disabled and remains enabled and active. At 220, the control system (e.g., the EPS system 116) commands the steering actuator 152 as part of the active steering feature based on the limited steering torque request to control steering of the vehicle 100. The method 200 then ends or returns to 204.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An active driver assistance system (ADAS) for a vehicle, the system comprising:
a steering wheel torque sensor configured to measure torque applied to a steering wheel by a driver of the vehicle and a steering actuator configured to control steering of the vehicle; and
a control system configured to:
receive the measured steering wheel torque that represents torque being applied to the steering wheel by the driver and obtain a steering torque request for an automatic steering feature of the ADAS;
based on the measured steering wheel torque, determine a steering torque request limit for the steering torque request of the automatic steering feature, the steering torque request limit being inversely proportional to the measured steering wheel torque applied by the driver such that an increase in the measured steering wheel torque corresponds to a decrease in the steering torque request limit for the automatic steering feature and vice-versa; and
command the steering actuator as part of the automatic steering feature based on the limited steering torque request such that the automatic steering feature is suppressed but remains enabled and active while steering wheel torque is being applied by the driver, thereby providing for both the automatic steering feature and the driver to steer the vehicle with the measured steering wheel torque applied by the driver controlling over the automatic steering feature,
wherein the control system is further configured to command the steering actuator by ramping up or down from a previous or current steering torque request to the limited steering torque request, and wherein the control system is configured to ramp up to the limited steering torque request at a different ramp up rate than a ramp down rate for ramping down to the limited steering torque request.

2. The system of claim 1, wherein the automatic steering feature is only disabled in response to an evasive or emergency maneuver by the driver where steering wheel power exceeds a predetermined threshold; and wherein the ramp down rate is faster than the ramp up rate thereby eliminating a need for the driver to overpower the steering actuator and providing for gradual ramp up to the limited steering torque request.

3. The system of claim 1, further comprising a steering wheel contact sensor configured to detect hand contact by the driver on the steering wheel, wherein the control system is configured to determine the steering torque request limit based on whether or not driver hand contact is detected by the steering wheel contact sensor.

4. The system of claim 3, wherein no driver hand contact detected by the steering wheel contact sensor corresponds to an increase in the steering torque request limit and vice-versa.

5. The system of claim 1, further comprising a vehicle speed sensor configured to measure a speed of the vehicle, wherein the control system is configured to determine the steering torque request limit based on the measured vehicle speed.

6. The system of claim 1, wherein the control system is configured to determine the steering torque request based on captured information relating to keeping the vehicle on its desired path.

7. A method of operating an active driver assistance system (ADAS) of a vehicle, the method comprising:
  receiving, by a vehicle control system and from a steering wheel torque sensor, a measured torque applied to a steering wheel by a driver of the vehicle;
  obtaining, by the control system, a steering torque request for an automatic steering feature of the ADAS;
  determining, by the control system, a steering torque request limit for the for the steering torque request of the active steering feature that is based on the measured steering wheel torque, the steering torque request limit being inversely proportional to the measured steering wheel torque applied by the driver such that an increase in the measured steering wheel torque corresponds to a decrease in the steering torque request limit for the automatic steering feature and vice-versa; and
  commanding, by the control system and based on the limited steering torque request, a steering actuator that is configured to control steering of the vehicle as part of the automatic steering feature such that the automatic steering feature is suppressed but remains enabled and active while steering wheel torque is being applied by the driver, thereby providing for both the automatic steering feature and the driver to steer the vehicle with the measured steering wheel torque applied by the driver controlling over the enabled automatic steering feature,
  wherein commanding the steering actuator comprises ramping up or down, by the control system, from a previous or current steering torque to the limited steering torque request, and wherein the control system ramps up to the limited steering torque request at a different ramp up rate than a ramp down rate for ramping down to the limited steering torque request.

8. The method of claim 7, further comprising receiving, by the control system and from a steering wheel contact sensor, a signal indicative of detected hand contact by the driver on the steering wheel, wherein the control system determines the steering torque request limit based on whether or not the driver hand contact is detected by the steering wheel contact sensor.

9. The method of claim 8, wherein no driver hand contact detected by the steering wheel contact sensor corresponds to an increase in the steering torque request limit and vice-versa.

10. The method of claim 7, further comprising receiving, by the control system and from a vehicle speed sensor, a measured speed of the vehicle, wherein the control system determines the steering torque request limit based on the measured vehicle speed.

11. The method of claim 7, further comprising determining, by the control system, the steering torque request based on captured information relating to keeping the vehicle on its desired path.

12. The method of claim 7, wherein the automatic steering feature is only disabled in response to an evasive or emergency maneuver by the driver where steering wheel power exceeds a threshold; and wherein the ramp down rate is faster than the ramp up rate thereby eliminating a need for the driver to overpower the steering actuator and providing for gradual ramp up to the limited steering torque request.

* * * * *